US008626428B2

(12) United States Patent
Ramaiah et al.

(10) Patent No.: US 8,626,428 B2
(45) Date of Patent: Jan. 7, 2014

(54) SELECTABLE DISPLAY OF AIRCRAFT TRAFFIC ON TRACKS

(75) Inventors: Vinoda Ramaiah, Karnataka (IN); Kiran Gopala Krishna, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 169 days.

(21) Appl. No.: 13/171,193

(22) Filed: Jun. 28, 2011

(65) Prior Publication Data

US 2013/0006511 A1 Jan. 3, 2013

(51) Int. Cl.
*G06F 19/00* (2011.01)
*G06G 7/76* (2006.01)

(52) U.S. Cl.
USPC .......... 701/120

(58) Field of Classification Search
USPC .......... 701/120
See application file for complete search history.

(56) References Cited

U.S. PATENT DOCUMENTS

| | | | | |
|---|---|---|---|---|
| 5,179,377 | A | 1/1993 | Hancock | |
| 6,085,150 | A | 7/2000 | Henry et al. | |
| 6,154,151 | A | 11/2000 | McElreath et al. | |
| 6,473,003 | B2 | 10/2002 | Horvath et al. | |
| 7,307,578 | B2 * | 12/2007 | Blaskovich et al. | 342/29 |
| 7,477,985 | B2 | 1/2009 | Shirley et al. | |
| 7,495,601 | B2 * | 2/2009 | Blaskovich et al. | 342/29 |
| 7,570,178 | B1 | 8/2009 | Whalen et al. | |
| 7,646,313 | B2 | 1/2010 | Winkler et al. | |
| 7,808,377 | B2 | 10/2010 | Shafaat et al. | |
| 8,203,465 | B2 * | 6/2012 | Shafaat et al. | 340/971 |
| 8,417,397 | B2 * | 4/2013 | Khatwa et al. | 701/14 |
| 2002/0111740 | A1 | 8/2002 | Horvath | |
| 2005/0109872 | A1 * | 5/2005 | Voos et al. | 244/3.17 |
| 2006/0227036 | A1 | 10/2006 | Blaskovich | |
| 2009/0109065 | A1 | 4/2009 | Pinheiro | |
| 2010/0152932 | A1 | 6/2010 | Das | |
| 2010/0283635 | A1 | 11/2010 | Brinkman et al. | |
| 2010/0286900 | A1 * | 11/2010 | Depape et al. | 701/120 |
| 2011/0006918 | A1 * | 1/2011 | Shafaat et al. | 340/945 |
| 2011/0187588 | A1 * | 8/2011 | Khatwa et al. | 342/26 B |

(Continued)

FOREIGN PATENT DOCUMENTS

EP 1752739 A2 2/2007

OTHER PUBLICATIONS

EP Search Report, EP 12172844.8-1803/2541526 dated Sep. 27, 2013.
EP Office Action, EP 12 172 844.8 dated Oct. 15, 2013.

*Primary Examiner* — Khoi Tran
*Assistant Examiner* — Robert Nguyen
(74) *Attorney, Agent, or Firm* — Ingrassia Fisher & Lorenz, P.C.

(57) ABSTRACT

A method of displaying aircraft traffic information on a display element of a host aircraft begins by displaying a lateral display and an in-trail procedure (ITP) display. The lateral display includes representations of tracks corresponding to flight path constraints, the host aircraft, and neighboring aircraft, wherein the host aircraft and the neighboring aircraft are displayed in alignment with the tracks. The ITP display includes representations of flight levels including a current flight level of the host aircraft. The method continues by receiving a command that indicates selection of one of the displayed tracks. In response to the command, the ITP display is rendered to display representations of neighboring aircraft traveling on the selected track, in the absence of neighboring aircraft traveling on tracks other than the selected track.

19 Claims, 10 Drawing Sheets

(56) References Cited

U.S. PATENT DOCUMENTS

2011/0224847 A1* 9/2011 Singer et al. .................... 701/4
2011/0276198 A1* 11/2011 Khatwa et al. .................. 701/3
2011/0282568 A1* 11/2011 Khatwa et al. ................ 701/121
2011/0316857 A1* 12/2011 Pepitone et al. .............. 345/467
2012/0095623 A1* 4/2012 Barral et al. ..................... 701/4
2012/0102422 A1* 4/2012 Letsu-Dake et al. .......... 715/772

* cited by examiner

SELECTABLE DISPLAY OF AIRCRAFT TRAFFIC ON TRACKS

TECHNICAL FIELD

Embodiments of the subject matter described herein relate generally to avionics systems such as flight display systems. More particularly, embodiments of the subject matter relate to the display of aircraft traffic on designated tracks, such as oceanic tracks.

BACKGROUND

Commercial aircraft flying over an ocean (or any geographic region where communication with air traffic control is limited or non-existent) may be restricted to certain predetermined oceanic tracks that are generally parallel to one another when viewed from above. Thus, the flight paths of commercial aircraft may be constrained to a designated set of oceanic tracks, and the tracks can be updated from time to time (such as every twelve hours) to contemplate traffic volume, weather conditions, and other factors. The in-trail procedure (ITP) is a protocol followed by aircraft flying in accordance with designated oceanic tracks. The ITP protocol is followed by an aircraft that desires to change its current flight level to a new flight level by descending or climbing in front of or behind one or more potentially blocking aircraft that are flying at an intervening flight level. In accordance with the ITP, certain conditions must be satisfied before the flight crew member issues a request for clearance to proceed with the flight level change. Whether or not the conditions are satisfied will depend on a number of dynamically changing factors associated with the host aircraft and other aircraft, such as the current geographic position of the aircraft, the current speed of the aircraft, the current heading of the aircraft, the desired new flight level, and the current flight level.

Modern flight deck instrumentation might include a vertical profile display or a vertical situation display (VSD) that provides a two-dimensional representation of an aircraft, the aircraft vertical flight plan, and neighboring aircraft. VSDs typically include a number of parameters and visual indicators that enable the pilot to form a quick mental picture of the vertical situation of the host aircraft. For example, VSDs may include displays of an aircraft symbol, the aircraft altitude, the vertical flight plan, and terrain. Thus, a member of the aircraft flight crew can obtain information related to the vertical situation of the aircraft relative to the terrain with a simple glance at the VSD.

A VSD could be used to identify the vertical position of potentially blocking aircraft for purposes of the ITP. Even if a VSD is deployed, however, the flight crew member will still need to mentally interpret the traffic situation and/or perform manual calculations related to the designation of potentially blocking aircraft and related to the determination of whether the conditions exist requiring the ITP protocol be used for a desired flight level change. Conventional VSDs display all air traffic within some predetermined maximum range relative to the host aircraft. Accordingly, a conventional VSD might become cluttered with many graphical representations of neighboring aircraft, whether or not such neighboring aircraft are relevant for purposes of the ITP.

BRIEF SUMMARY

A method of displaying aircraft traffic information on a display element of a host aircraft is provided. The method displays a lateral display comprising graphical representations of the host aircraft and a plurality of tracks corresponding to flight path constraints for the host aircraft and for neighboring aircraft other than the host aircraft. The method continues by receiving a command that indicates selection of one of the plurality of tracks. In response to receiving the command, the method display a vertical situation display (VSD) comprising graphical representations of neighboring aircraft, each of the neighboring aircraft having a respective flight path that corresponds to the selected track, the VSD being void of graphical representations of neighboring aircraft having flight paths that do not correspond to the selected track.

Also provided is a flight deck display system for a host aircraft that is constrained to a set of flight paths corresponding to a plurality of designated tracks. The system includes: an aircraft-to-aircraft data communication module that receives current flight status data of neighboring aircraft, the neighboring aircraft being constrained to the set of flight paths; a processor coupled to the aircraft-to-aircraft data communication module, the processor being configured to obtain and process the current flight status data along with current host aircraft flight status data, and the processor being configured to generate image rendering display commands based upon the current flight status data and the current host aircraft flight status data; and a display element coupled to the processor and configured to receive the image rendering display commands and, in response thereto, to render an in-trail procedure (ITP) display that includes graphical representations of a number of neighboring aircraft, each of the neighboring aircraft having a respective flight path that corresponds to a selected track of the plurality of designated tracks, the ITP display being void of graphical representations of any neighboring aircraft having flight paths that do not correspond to the selected track.

A method of displaying aircraft traffic information on a display element of a host aircraft is also provided. The method involves displaying a lateral display comprising graphical representations of a plurality of tracks corresponding to flight path constraints, the host aircraft, and neighboring aircraft, wherein the host aircraft and the neighboring aircraft are displayed in alignment with the plurality of tracks. The method also involves displaying an ITP display comprising graphical representations of a plurality of flight levels including a current flight level of the host aircraft. The method continues by receiving a command that indicates selection of one of the tracks displayed on the lateral display, resulting in a selected track. In response to receiving the command, the method display, on the ITP display, graphical representations of selected neighboring aircraft traveling on the selected track, in the absence of graphical representations of any neighboring aircraft traveling on tracks other than the selected track.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
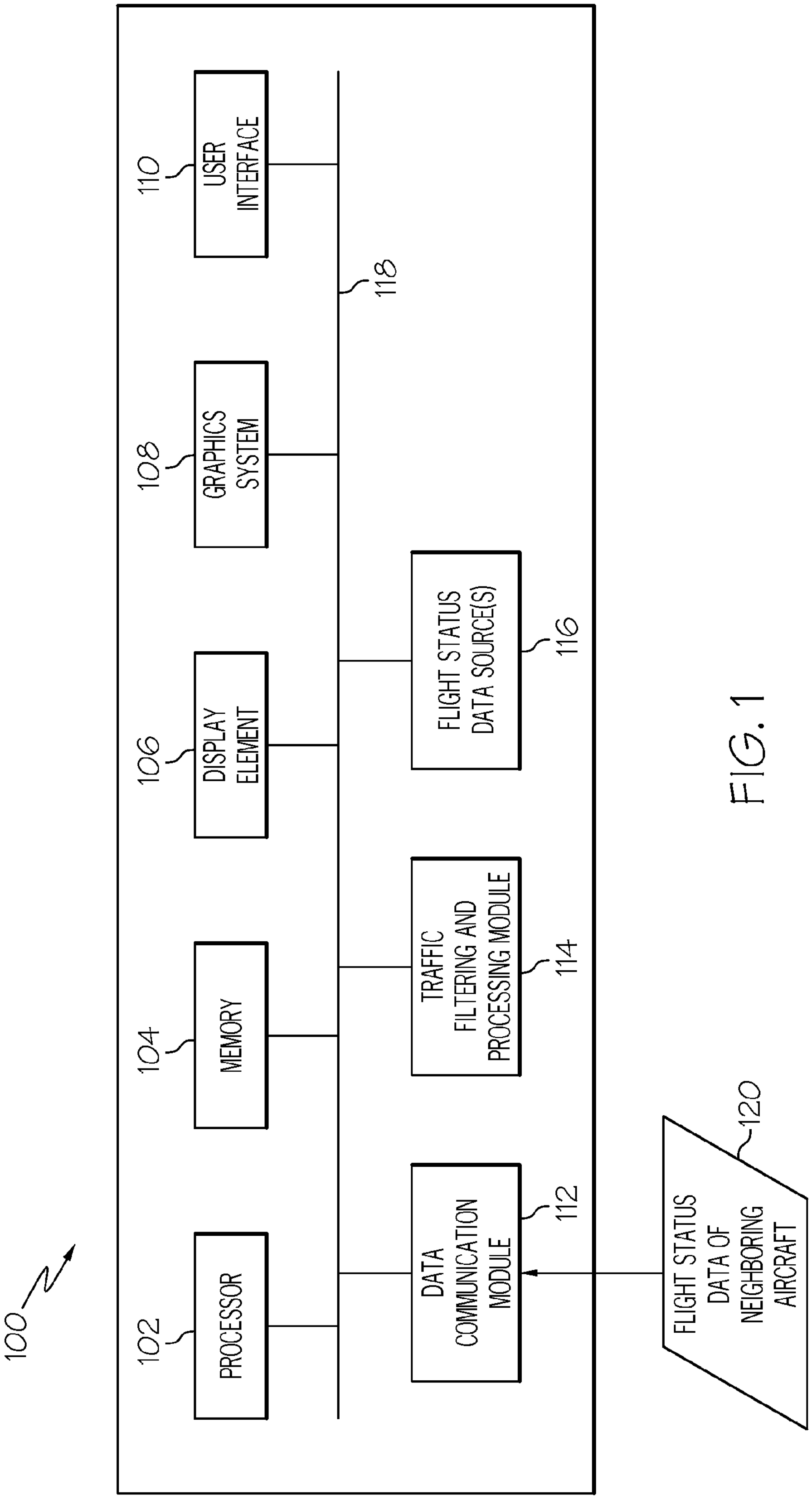
FIG. 1 is a schematic representation of an exemplary embodiment of a flight deck display system.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter described herein relates to an onboard flight deck display system and related operating methods and processes that display aircraft traffic information on a display element of a host aircraft. In certain embodiments, the display element is used to render a split-screen rendering that includes both a lateral view and a vertical profile view of aircraft traffic. The content of the display is updated in response to user interaction, e.g., data input, selection or highlighting of displayed items, or activation of graphical user interface (GUI) elements. For example, in response to the selection of an oceanic track displayed on the lateral view, the vertical profile view is updated to only show traffic that is currently traveling on the selected track. Moreover, the traffic on the selected track may be highlighted or otherwise visually distinguished on the lateral view. Thereafter, in response to the selection of a flight level (altitude) displayed on the vertical profile view, the lateral view and/or the vertical view are updated to highlight intervening traffic travelling at a flight level between the current flight level of the host aircraft and the selected flight level. Thereafter, in response to the selection of an intervening reference aircraft, the lateral view and/or the vertical view are updated to highlight the selected reference aircraft. At that time, the system may generate and render a message to enable the user to issue an ITP request for clearance to change flight levels.

FIG. 1 is a schematic representation of an exemplary embodiment of a flight deck display system 100 that is suitable for use with a vehicle such as an aircraft. In exemplary embodiments, the display system 100 is located onboard the host aircraft, i.e., the various components and elements of the display system 100 reside within the host aircraft, are carried by the host aircraft, or are attached to the host aircraft. The illustrated embodiment of the display system 100 includes, without limitation: at least one processor 102; an appropriate amount of memory 104; a display element 106; a graphics system 108; a user interface 110; a data communication module 112; a traffic filtering and processing module 114; and at least one source of flight status data 116. These elements of the display system 100 may be coupled together by a suitable interconnection architecture 118 that accommodates data communication, the transmission of control or command signals, and/or the delivery of operating power within the display system 100. It should be understood that FIG. 1 is a simplified representation of the display system 100 that will be used for purposes of explanation and ease of description, and that FIG. 1 is not intended to limit the application or scope of the subject matter in any way. In practice, the display system 100 and the host aircraft will include other devices and components for providing additional functions and features, as will be appreciated in the art. Furthermore, although FIG. 1 depicts the display system 100 as a single unit, the individual elements and components of the display system 100 could be implemented in a distributed manner using any number of physically distinct pieces of hardware or equipment.

The processor 102 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. As described in more detail below, the processor 102 and/or the traffic filtering and processing module 114 could be utilized to obtain, process, and "filter" aircraft data for purposes of generating and rendering the lateral and vertical displays having the characteristics described herein. In this regard, the processor and/or the traffic filtering and processing module 114 might identify aircraft that are located within certain altitude boundaries, identify aircraft that are located within certain lateral boundaries relative to the host aircraft, identify aircraft traveling on certain oceanic tracks, or the like.

The memory 104 may be realized as RAM memory, flash memory, EPROM memory, EEPROM memory, registers, a hard disk, a removable disk, a CD-ROM, or any other form of storage medium known in the art. In this regard, the memory 104 can be coupled to the processor 102 such that the processor 102 can read information from, and write information to, the memory 104. In the alternative, the memory 104 may be integral to the processor 102. As an example, the processor 102 and the memory 104 may reside in an ASIC. In practice, a functional or logical module/component of the display system 100 might be realized using program code that is maintained in the memory 104. For example, the graphics system 108, the data communication module 112, or the traffic filtering and processing module 114 may have associated software program components that are stored in the memory 104. Moreover, the memory 104 can be used to store data utilized to support the operation of the display system 100, as will become apparent from the following description.

In an exemplary embodiment, the display element 106 is coupled to the graphics system 108. The graphics system 108 is coupled to the processor 102 such that the processor 102 and the graphics system 108 cooperate to display, render, or otherwise convey one or more graphical representations, synthetic displays, graphical icons, GUI elements, visual symbology, or images associated with operation of the host aircraft on the display element 106, as described in greater detail below. An embodiment of the display system 100 may utilize existing graphics processing techniques and technologies in conjunction with the graphics system 108. For example, the graphics system 108 may be suitably configured to support well known graphics technologies such as, without limitation, VGA, SVGA, UVGA, or the like.

In an exemplary embodiment, the display element 106 is realized as an electronic display configured to graphically display flight information or other data associated with operation of the host aircraft under control of the graphics system 108. The display element 106 is usually located within a cockpit of the host aircraft. The display element 106 could also be implemented as a virtual display of the type used with head up display technology. Moreover, the display element 106 could be integrated in equipment worn or carried by the user, e.g., a display mounted to eyewear, headwear, or the like. In practice, the processor 102 and/or the graphics system 108 produces image rendering display commands that are received by the display element 106 for purposes of rendering VSDs. It will be appreciated that although FIG. 1 shows a single display element 106, in practice, additional cooperating display devices may be present onboard the host aircraft.

The illustrated embodiment of the display system 100 includes a user interface 110, which is suitably configured to receive input from a user (e.g., a pilot) and, in response to user-entered data, supply appropriate command, control, or instruction signals to the processor 102. The user interface 110 may be any one, or any combination, of various known user interface devices or technologies, including, but not limited to: a cursor control device such as a mouse, a trackball, or joystick; a keyboard; buttons; switches; or knobs. Moreover, the user interface 110 may cooperate with the display element 106 and the graphics system 108 to provide a GUI. In other words, the user interface 110 could be implemented as a GUI rendered on the display element 106. In certain embodiments, the display element 106 implements touch-sensitive technology for purposes of the user interface 110. Thus, a user can manipulate the user interface 110 by moving a cursor symbol rendered on the display element 106 and/or by physically interacting with the display element 106 itself, and the user may use a keyboard to, among other things, input textual data. For example, the user could manipulate the user interface 110 to identify or select a displayed oceanic track, to identify or select a displayed flight level, to identify or select a displayed aircraft, to enter a desired or requested new flight level into the display system 100, to enter lateral or altitude boundary (filtering) values, and to change the display modes of the display system 100 as desired.

In an exemplary embodiment, the data communication module 112 is suitably configured to support data communication between the host aircraft and one or more remote systems. More specifically, the data communication module 112 is used to receive current flight status data 120 of other aircraft that are near the host aircraft. In this regard, the data communication module 112 represents instrumentation that obtains aircraft data used by the display system 100. In particular embodiments, the data communication module 112 is implemented as an aircraft-to-aircraft data communication module that receives flight status data from an aircraft other than the host aircraft. For example, the data communication module 112 may be configured for compatibility with Automatic Dependant Surveillance-Broadcast (ADS-B) technology, with Traffic and Collision Avoidance System (TCAS) technology, and/or with similar technologies. In other embodiments the data communication module 112 may also be compatible with Traffic Information Service-Broadcast (TIS-B) technology.

ADS-B technology is presently being evaluated and will soon integrate with onboard avionics systems. In this regard, ADS-B traffic can be displayed using the display system 100 (this application is referred to as Cockpit Display of Traffic Information or "CDTI"). The display of CDTI traffic promises various new procedures that enable better air traffic management, shorter routes, and fuel saving for the operators. However, currently proposed procedures and methodology associated with requests for clearances (such as ITP requests) through the CDTI application are textual or are only partially graphical. The methodology described in more detail below need not rely on textual data input, and is more efficient and intuitive than conventional approaches. As will become apparent from the following description, representing ITP traffic with additional cues and requesting clearances graphically reduces pilot workload and increases situational awareness.

The flight status data 120 of the neighboring aircraft may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display system 100 is suitably designed to process the flight status data 120 in the manner described in more detail herein. In particular, the display system 100 can use the flight status data 120 when rendering a lateral display, an ITP display, and/or a VSD on the display element 106.

The traffic filtering and processing module 114 is configured to perform various operations, calculations, data analysis, and other functions associated with the generation of traffic displays. For example, the traffic filtering and processing module 114 may be suitably configured to calculate or otherwise obtain altitude boundaries or lateral boundary criteria that influences the manner in which neighboring aircraft are rendered on a display view. As explained in more detail below, the traffic filtering and processing module 114 is also designed to determine the aircraft traffic travelling on a selected oceanic track, for purposes of selectively displaying traffic on an ITP display in a track-by-track basis. In certain embodiments, the traffic filtering and processing module 114 may be disabled or deactivated (by the user or automatically) if so desired such that the display includes graphical representations of all of the neighboring aircraft located within a designated or selected range relative to the host aircraft.

In operation, the display system 100 also processes the current flight status data of the host aircraft. In this regard, the sources of flight status data 116 generate, measure, and/or provide different types of data related to the operational status of the host aircraft, the environment in which the host aircraft is operating, flight parameters, and the like. In this regard, the sources of flight status data 116 represent instrumentation that obtains aircraft data used by the display system 100. In practice, the sources of flight status data 116 may be realized using line replaceable units (LRUs), transducers, accelerometers, instruments, sensors, and other well known devices. The data provided by the sources of flight status data 116 may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display system 100 is suitably designed to process data obtained from the sources of flight status data 116 in the manner described in more detail herein. In particular, the display system 100 can use the flight status data of the host aircraft when rendering the various displays.

As mentioned previously, a VSD provides a graphical representation of the host aircraft and neighboring aircraft using a side or vertical profile perspective. As used herein, an ITP represents one type of VSD that can be utilized to assist the flight crew during oceanic travel and, in particular, to assist the flight crew during an ITP procedure. A lateral display corresponds to a plan view (top view) of the air traffic near the host aircraft. The exemplary embodiment described here employs a split-screen view that includes both an ITP display and a corresponding lateral display, both of which are refreshed or updated as needed to represent the current flight situation in real-time or near-real-time (see, for example, FIGS. 4-10, which represent “snapshots” of a dynamic display taken at particular moments in time).

Figure 2:
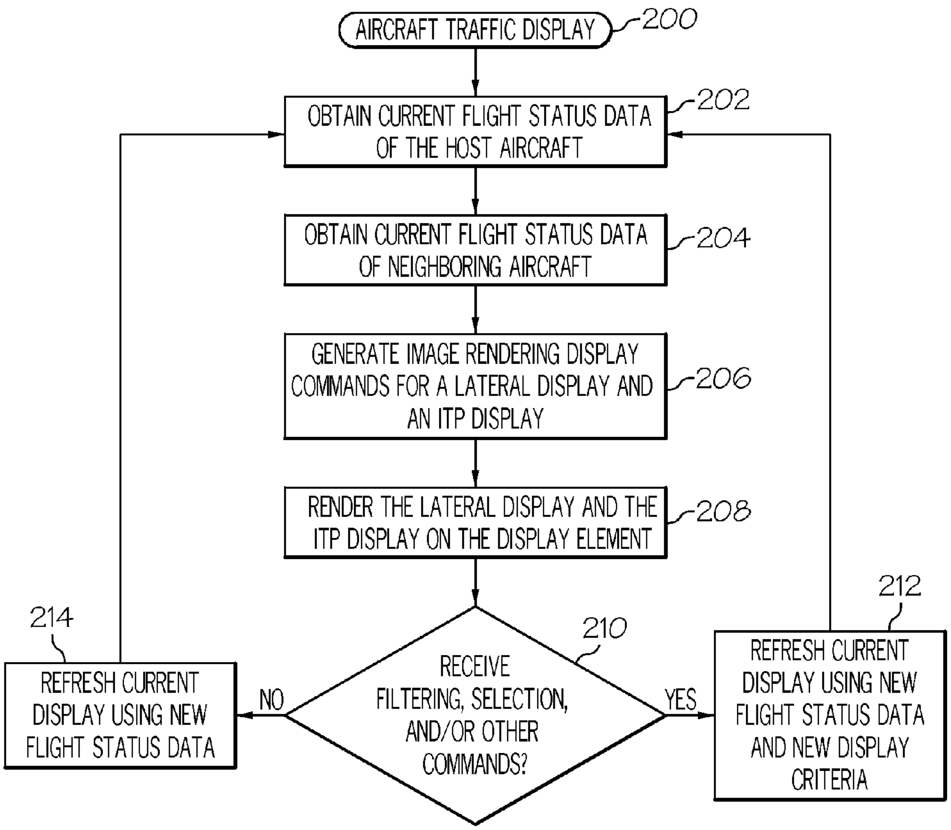
FIG. 2 is a flow chart that illustrates an exemplary embodiment of a process for displaying aircraft traffic.

FIG. 2 is a flow chart that illustrates an exemplary embodiment of a process 200 for displaying aircraft traffic. The process 200 is suitable for use for use with a flight deck display system such as the display system 100. Although not always required, this example assumes that the host aircraft and neighboring aircraft proximate the host aircraft are traveling on designated tracks, such as oceanic tracks. In this regard, the host aircraft and other traffic are constrained to a predetermined set of flight paths that correspond to a number of designated tracks.

The various tasks performed in connection with a process described herein may be performed by software, hardware, firmware, or any combination thereof. For illustrative purposes, the description of a process may refer to elements mentioned above in connection with FIG. 1. In practice, portions of a described process may be performed by different elements of the described system, e.g., a processor or processing module, a graphics module, a display element, or a data communication component. It should be appreciated that a described process may include any number of additional or alternative tasks, the tasks shown in the figures need not be performed in the illustrated order, and a described process may be incorporated into a more comprehensive procedure or process having additional functionality not described in detail herein. Moreover, one or more of the tasks shown in the figures could be omitted from an embodiment of a process as long as the intended overall functionality remains intact.

During operation of the host aircraft, the process 200 can be performed in a virtually continuous manner at a relatively high refresh rate. For example, an iteration of the process 200 could be performed once every two seconds (or less) such that the displays are updated in real-time or substantially real time in a dynamic manner. This particular embodiment of the process 200 begins by obtaining the current flight status data of the host aircraft (task 202). The process 200 may also obtain or retrieve a designated, desired, or maximum lateral display range for the lateral display and/or a designated or desired altitude range for the lateral and ITP displays. For the example presented here, the designated maximum lateral display range is eighty nautical miles, although other embodiments could use a different maximum selectable range. The altitude range represents a display filter that allows the user to declutter the displays by hiding aircraft that are outside of the designated altitude range. In practice, the altitude range may be defined between an upper flight level and a lower flight level, or between any two altitudes, or relative to the current flight level of the host aircraft. For example, an altitude filter of −5000 feet will cause the system to include aircraft traveling 5000 feet (or less) below the current altitude of the host aircraft, while hiding or disregarding aircraft traveling more than 5000 feet below the host aircraft and while hiding or disregarding aircraft traveling above the host aircraft.

The process 200 also receives or otherwise obtains the current flight status data of one or more other aircraft near the host aircraft (task 204). For this particular embodiment, task 204 obtains the current flight status data of neighboring aircraft located within the designated display ranges. In practice, the process 200 could collect additional aircraft data associated with neighboring aircraft located outside the designated display ranges, and thereafter discard or ignore that data if so desired. In preferred embodiments, task 204 is performed using an appropriate aircraft-to-aircraft data communication technology and related subsystem components located onboard the host aircraft. This enables the host aircraft to receive the current flight status data of the neighboring aircraft directly from those aircraft. Alternatively, the host aircraft could receive this information from a ground-based system. In yet other embodiments, aircraft-to-ground technology could be utilized (for example, data for surrounding aircraft is passed to the host aircraft via a data link to a ground facility using TIS-B).

Next, the process 200 generates appropriate image rendering display commands for the lateral display and the ITP display (task 206). Notably, these image rendering display commands will be generated based upon the current flight status data of the host aircraft and the current flight status data of the neighboring aircraft located within the designated lateral and vertical boundaries. In other words, only those neighboring aircraft that are members of a filtered subset are considered for the displays.

The process 200 continues by generating and rendering an appropriate lateral display and an appropriate ITP display on the display element of the host aircraft (task 208). The visual characteristics and content of the displays will be responsive or otherwise influenced by the image rendering display commands generated during task 206. The lateral display and the ITP display will include a number of graphical features, visual elements, and graphical representations that are intended for viewing by the pilot and/or other flight crew members. The lateral display typically includes, without limitation, graphical representations of: the host aircraft; the neighboring aircraft located within the lateral boundaries;

and the tracks corresponding to the flight paths of the host aircraft and the neighboring aircraft (see FIGS. 4-10). Notably, the lateral display will be devoid of graphical representations of any neighboring aircraft that are located outside the display filter boundaries. The ITP display typically includes, without limitation, graphical representations of: the neighboring aircraft located within the vertical boundaries; an altitude or flight level scale; and an ITP (lateral) distance scale (see FIGS. 4-10). In certain display modes, the ITP display also includes a graphical representation of the host aircraft.

As explained in more detail with reference to FIGS. 3-10, the lateral and/or ITP displays can be rendered with one or more active GUI elements that accommodate user interaction, selection, data entry, highlighting, or the like. Thus, a user can interact with a display to initiate commands, instructions, or requests associated with various filtering, selecting, or other control operations. To this end, if the process 200 receives a filtering, selection, control, and/or other command or instruction (query task 210), then the system refreshes the current displays using the newest or most current flight status data, along with the new display criteria associated with the received commands or instructions (task 212). Accordingly, the process 200 returns to task 202 to obtain updated flight status data and to refresh the display element in response to the updated data. In this way, the content of the rendered displays are dynamically updated as the host aircraft continues its flight path. If no user commands or instructions are received at query task 210, then the system simply refreshes the current displays using the newest or most current flight status data (task 214) by returning to task 202 and continuing as described above.

Figure 3:
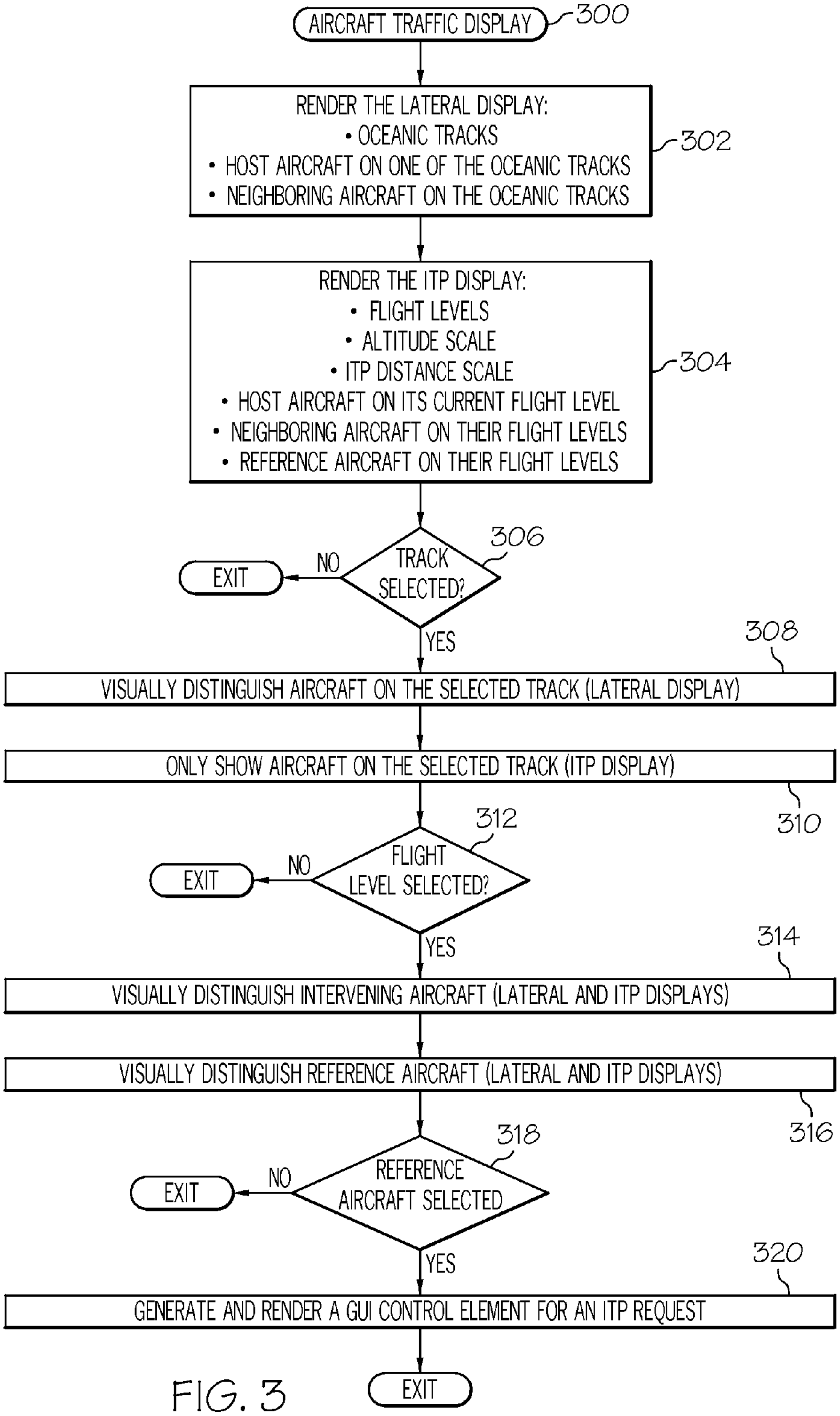
FIG. 3 is a flow chart that illustrates another exemplary embodiment of a process for displaying aircraft traffic.

As described above, user-entered commands, instructions, or selections influence the content of the lateral display and/or the ITP display. Moreover, manipulation of elements displayed on the lateral display might influence the content of the ITP display, and vice versa. FIGS. 3-10 illustrate the interactive nature of the displays in the context of one exemplary scenario. In this regard, FIG. 3 is a flow chart that illustrates another exemplary embodiment of a process 300 for displaying aircraft traffic, and FIGS. 4-10 are schematic representations of exemplary displays that depict lateral and vertical profile views of aircraft traffic at various times during the process 300. The process 300 may be performed in conjunction with the process 200 (described above). Indeed, some of the tasks associated with the process 300 are similar to counterpart tasks described above for the process 200. For the sake of brevity, common or similar aspects of the processes with not be redundantly described here in the context of the process 300.

Figure 4:
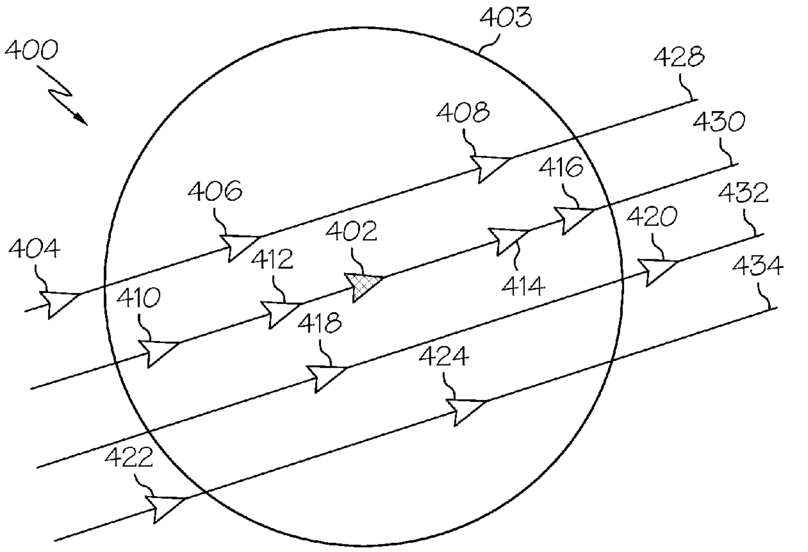
FIGS. 4-10 are schematic representations of exemplary displays that depict lateral and vertical profile views of aircraft traffic.
Figure 4:
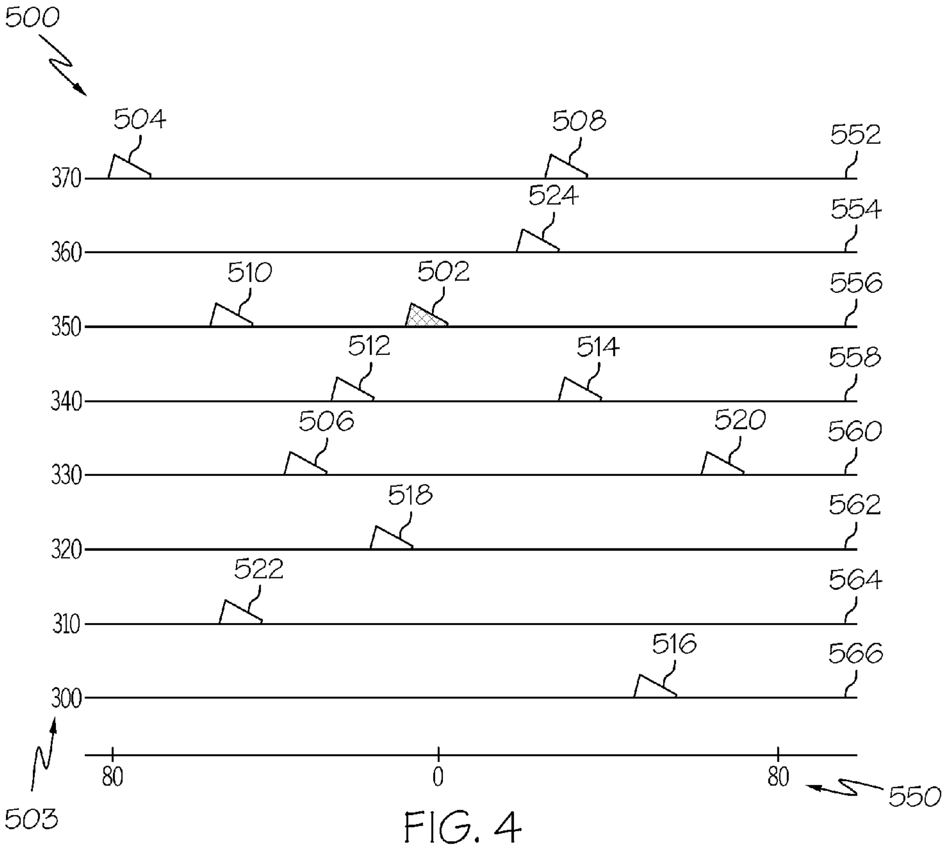

The process 300 renders and displays the lateral display (task 302) and the ITP display (task 304) in a manner that accurately represents the current flight conditions of the host aircraft and the neighboring aircraft. Referring to FIG. 4, the lateral display 400 and the ITP display 500 may be rendered in a split-screen arrangement as shown. The process 300 assumes that appropriate lateral and vertical boundaries (e.g., filters) have already been designated and implemented. This particular embodiment of the lateral display 400 generally includes, without limitation, graphical representations of the following items: the host aircraft 402; a range circle 403; a plurality of neighboring aircraft 404, 406, 408, 410, 412, 414, 416, 418, 420, 422, 424; and a plurality of tracks 428, 430, 432, 434. The displayed tracks correspond to flight path constraints for the host aircraft and for the neighboring aircraft (which are aircraft other than the host aircraft). The graphical representations of the host aircraft 402 and the neighboring aircraft 404-424 are displayed in alignment with the tracks 428-434. More specifically, each aircraft is displayed along or overlying its respective track. Although FIGS. 4-10 depict four parallel tracks 428-434, any number of tracks may be rendered, depending on the particular embodiment, the specifications of the display element, the current lateral boundaries, user preferences, etc.

In accordance with traditional plan view display techniques, the graphical representation of the host aircraft 402 remains in a fixed position (usually centered) on the lateral display 400. Although not shown in the figures, the lateral display 400 may also include identifiers or labels for each neighboring aircraft. For example, each neighboring aircraft could be identified by carrier and tail number. In certain embodiments, the host aircraft 402 is rendered such that it is visually distinguishable from the neighboring aircraft 404-434. In other words, the host aircraft 402 and/or the neighboring aircraft 404-434 can be rendered using certain visually distinguishable characteristics to make the host aircraft 402 noticeable or prominent in the lateral display 400. In this regard, the different visually distinguishable characteristics may correspond to any of the following characteristics, individually or in any combination thereof: different colors; different brightness; different transparency levels; different translucency levels; different line patterns; different line thickness; different shapes; different sizes; different flicker patterns; different focus levels; different sharpness levels; different clarity levels; and different contrast levels. In preferred embodiments, for example, the graphical representation of the host aircraft 402 is rendered as a solid shape in a designated color (such as white) that is easily distinguishable from other color schemes that might be used for other items in the lateral display 400.

The ITP display 500 corresponds to a side view of the airspace near the host aircraft. The depicted state of the ITP display 500 is consistent with that shown in the lateral display 400. Accordingly, the ITP display 500 includes graphical representations of all the neighboring aircraft located within the designated boundaries. This particular embodiment of the ITP display 500 generally includes, without limitation, graphical representations of the following items: the host aircraft 502; an altitude scale 503; a plurality of neighboring aircraft 504, 506, 508, 510, 512, 514, 516, 518, 520, 522, 524; and a lateral distance scale 550 (which may be expressed in ITP distance or "standard" (range) distance using nautical miles as the unit of measurement). The ITP display 500 may also include graphical representations of a plurality of different flight levels 552, 554, 556, 558, 560, 562, 564, 566. Although FIGS. 4-10 depict eight different flight levels 552-566, any number of flight levels may be rendered, depending on the particular embodiment, the specifications of the display element, the current vertical boundaries, user preferences, etc.

The reference numbers assigned to the aircraft depicted in FIGS. 4-10 begin with "4" for the lateral display and begin with "5" for the ITP display; the following two digits identify the particular aircraft. For example, reference number 402 identifies the host aircraft in the lateral display, and reference number 502 identifies the host aircraft in the ITP display. As another example, reference numbers 410 and 510 identify graphical representations of one neighboring aircraft, and reference numbers 420 and 520 identify graphical representations of another neighboring aircraft.

The altitude (or flight level) scale 503 may include alphanumeric indicia of altitude values in any convenient scale (in FIG. 4, the altitude scale 503 includes numerical values expressed in hundreds of feet, in increments of one thousand feet). In certain embodiments, the altitude scale 503 is rendered as a scrollable tape such that the host aircraft 502 is always rendered at the same vertical position on the ITP display 500. At the time depicted in FIG. 4, the current flight level of the host aircraft 502 is 35,000 feet. Accordingly, the host aircraft 502 is rendered on or overlapping its current flight level 556. Similarly, each neighboring aircraft 504-524 (including any reference aircraft for purposes of the ITP procedure) is rendered on or overlapping its respective flight level.

The lateral distance scale 550 may include alphanumeric indicia of distance values in any convenient scale (in FIG. 4, the lateral distance scale 550 includes numerical values that represent distance relative to the host aircraft 502, expressed in nautical miles). In this embodiment, the lateral distance scale 550 has a zero reference point that corresponds to the current position of the host aircraft. In other words, the graphical representation of the host aircraft 502 is aligned with the zero lateral distance mark on the lateral distance scale 550. Consequently, the host aircraft 502 and the lateral distance scale 550 are rendered in fixed positions on the ITP display 500. In contrast, during operation, the altitude scale 503, the flight levels 552-566, and the neighboring aircraft 504-524 can be rendered in a dynamic manner that reflects the changing flight conditions and aircraft positions.

Notably, the graphical representations of the host aircraft and the neighboring aircraft are positioned in the lateral display 400 and the ITP display 500 in accordance with the current flight status data of the host aircraft and in accordance with the current flight data of the neighboring aircraft (which may be received by the host aircraft using, for example, ADS-B technology). Thus, graphical representations of the neighboring aircraft are positioned in a manner that indicates the actual respective altitudes of the neighboring aircraft relative to the host aircraft, and in a manner that indicates the actual distance of interest (e.g., a standard distance measure, the ITP distance, or other suitable distance metric) between the other aircraft and the host aircraft. Consequently, the current distance and vertical separation between the host aircraft and the nearby aircraft can be quickly and easily determined from the lateral display 400 and the ITP display 500.

FIG. 4 depicts the lateral display 400 and the ITP display 500 in their initial or "default" states, where the amount of rendered neighboring aircraft is determined by lateral and/or altitude filter boundaries. For example, the ITP display 500 is subject to an altitude filter setting of +2000/−5000, relative to the current altitude of the host aircraft. Accordingly, the ITP display 500 is void of graphical representations of neighboring aircraft that do not satisfy the altitude filter setting. In other words, the ITP display 500 does not include any neighboring aircraft above 37,000 feet, or any neighboring aircraft below 30,000 feet.

Although not shown in the figures, the ITP display 500 may also include identifiers or labels for each neighboring aircraft, such as carrier and tail number. In certain embodiments, the host aircraft 502 is rendered such that it is visually distinguishable from the neighboring aircraft 504-524. For example, the host aircraft 502 may be rendered using one or more of the visually distinguishable characteristics listed previously. For this example, the graphical representation of the host aircraft 502 is rendered as a solid shape in a designated color (such as white), and in a manner that is consistent with the graphical representation of the host aircraft 402 in the lateral display 400.

The lateral display 400 is generated and rendered to accommodate the selection of the displayed tracks. In practice, a user could select a track by manipulating a pointing device, by manipulating a keyboard or a keypad, by interacting with a touch-screen area, or the like. Referring again to FIG. 3, if no track is selected (the "No" branch of query task 306), then the process 300 may exit and return to an appropriate task. For example, the process 300 may wait for the next refresh or update time, or it may continue monitoring for a track selection command or instruction. If, however, the process receives a command that indicates selection of one of the rendered tracks (the "Yes" branch of query task 306), then the system responds in an appropriate manner to update and refresh the lateral display and/or the ITP display, preferably both. In particular, the lateral display is updated to visually distinguish the selected track and to visually distinguish the aircraft on the selected track (task 308). In addition, the ITP display is updated such that it includes graphical representations of neighboring aircraft having flight paths corresponding to the selected track, while being void of graphical representations of neighboring aircraft having flight paths that do not correspond to the selected track. In other words, the ITP display is refreshed such that it only depicts neighboring aircraft traveling on the selected track. These "on-track" aircraft are displayed in the absence of any neighboring aircraft traveling on tracks other than the selected track.

Figure 5:
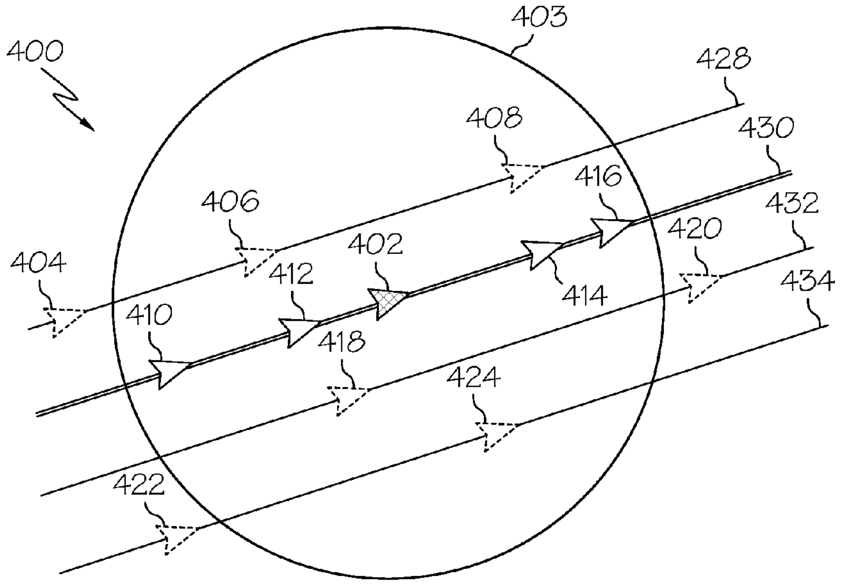
Figure 5:
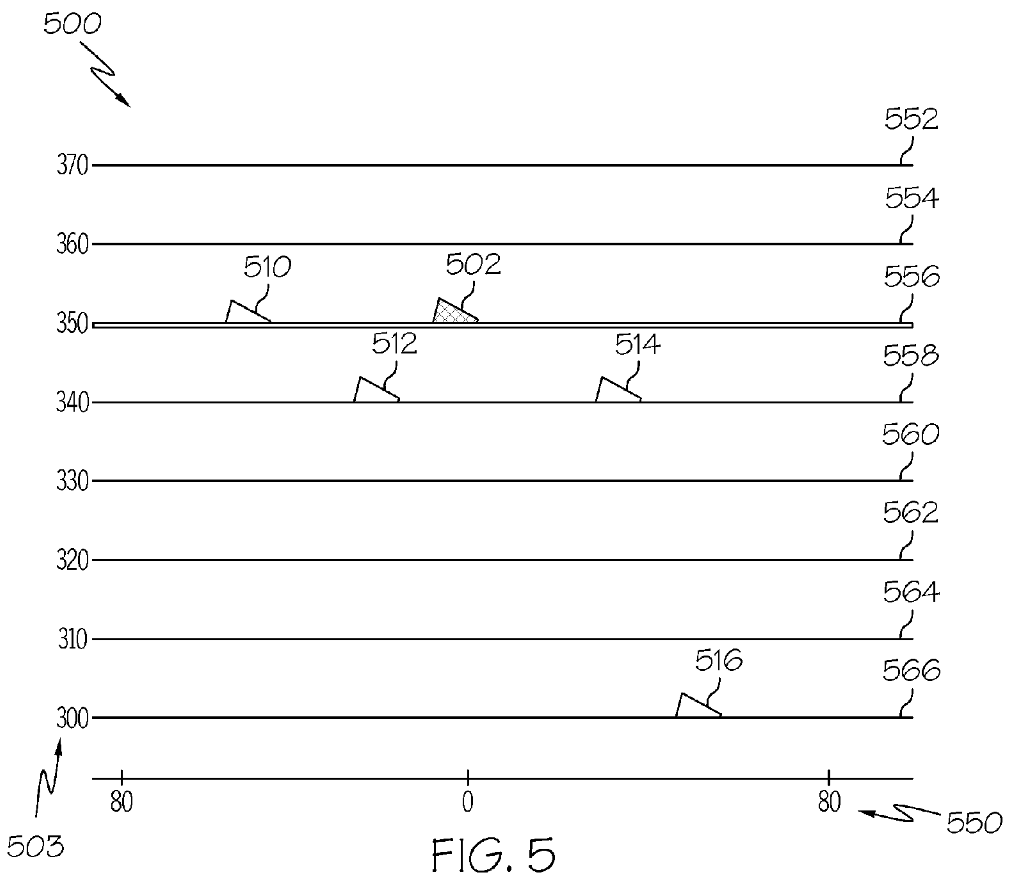

FIG. 5 depicts the lateral display 400 and the ITP display 500 following the selection of a displayed track. This example assumes that the selected track is the track on which the host aircraft is currently traveling. In other words, the host aircraft has a flight path that corresponds to the selected track. Accordingly, the lateral display 400 has been refreshed such that the track 430 is highlighted or is otherwise rendered in a visually distinguishable manner relative to the remaining tracks 428, 432, 434. For example, the track 430 may be rendered in a distinct color (such as cyan) and/or it may be rendered in a different thickness or weight relative to the lines that correspond to the other tracks 428, 432, 434. Moreover, the neighboring aircraft on the selected track 430 (namely, the neighboring aircraft 410, 412, 414, 416) are highlighted or otherwise rendered in a visually distinguishable manner relative to the other neighboring aircraft (namely, the neighboring aircraft 404, 406, 408, 418, 420, 422, 424). For this particular example, the neighboring aircraft 410 412, 414, 416 are rendered using solid white outlines, while the "unselected" neighboring aircraft are grayed out, made transparent, or the like. These changes to the lateral display 400 enable the user to quickly and easily determine which aircraft are currently traveling on the selected track 430.

In response to the selection of the track 430, the ITP display 500 is updated to hide or remove all aircraft other than the host aircraft 502 and the neighboring aircraft traveling on the selected track 430 (i.e., the neighboring aircraft 510, 512, 514, 516). In other words, the ITP display 500 is transformed such that it represents a side profile view of only the selected track 430. The ITP display 500 may also be updated to highlight or otherwise visually distinguish the current flight level of the host aircraft (namely, the flight level 556) relative to the other displayed flight levels. For example, the flight level 556 may be rendered in a distinct color (such as cyan) and/or it may be rendered in a different thickness or weight relative to the lines that correspond to the other displayed flight levels. These changes to the ITP display 500 make it easier for the user to focus on potentially blocking aircraft that are traveling in the same track as the host aircraft.

The ITP display 500 is generated and rendered to accommodate the selection of the displayed flight levels. In practice, a user could select a flight level by manipulating a pointing device, by manipulating a keyboard or a keypad, by interacting with a touch-screen area, or the like. Referring again to FIG. 3, if no flight level is selected (the "No" branch of query task 312), then the process 300 may exit and return to an appropriate task. For example, the process 300 may wait for the next refresh or update time, it may continue monitoring for a flight level selection command or instruction, or it may check for the selection of a different track. If, however, the process 300 receives a command that indicates selection of one of the rendered flight levels (the "Yes" branch of query task 312), then the system responds in an appropriate manner to update and refresh the lateral display and/or the ITP display, preferably both. In particular, the displays are updated to visually distinguish or highlight a subset of the neighboring aircraft, namely, intervening aircraft located between the selected flight level and the current flight level of the host aircraft (task 314).

Figure 6:
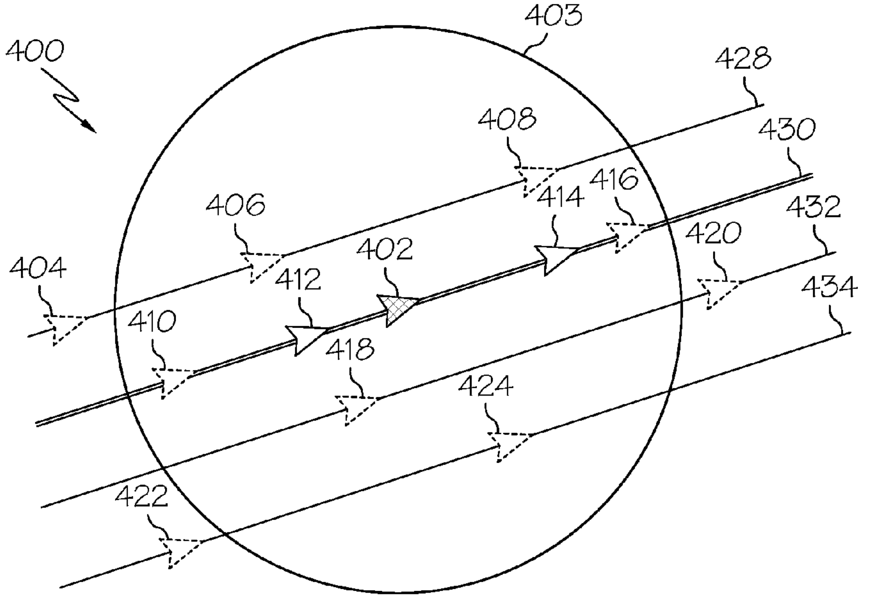
Figure 6:
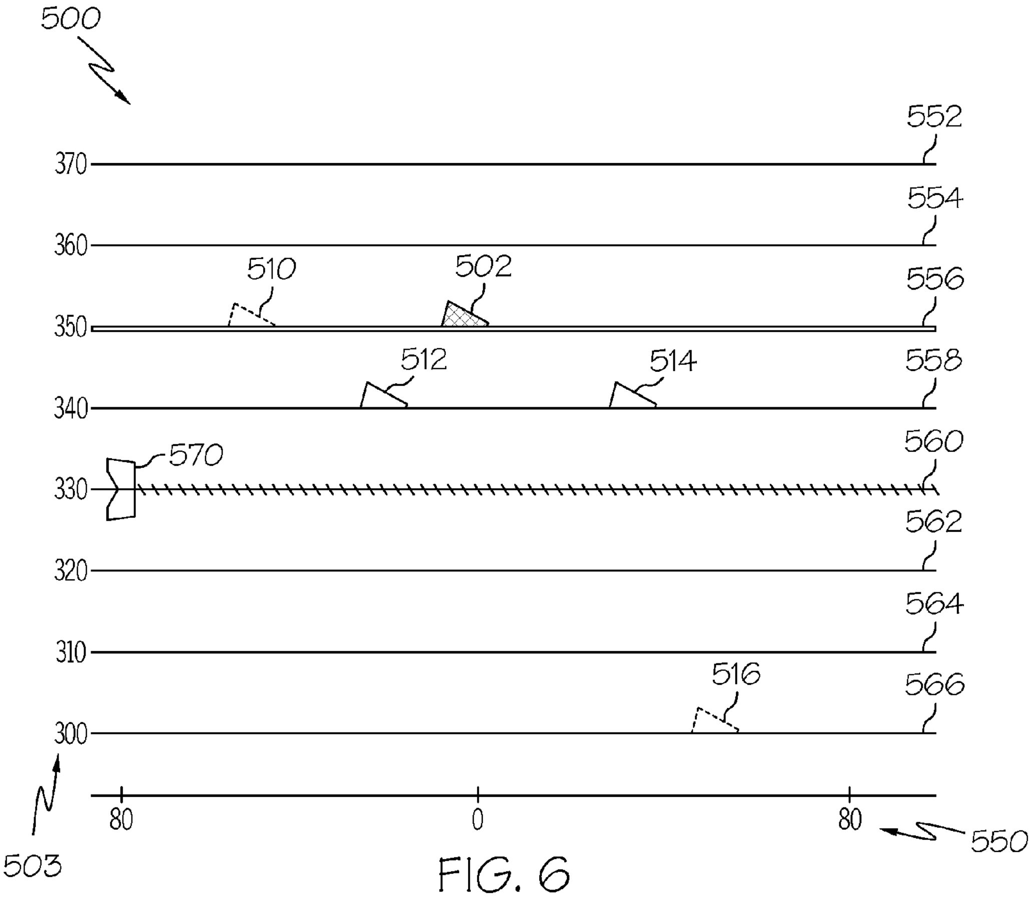

FIG. 6 depicts the lateral display 400 and the ITP display 500 following the selection of a displayed flight level. This example assumes that the flight level 560 has been selected. In practice, the selected flight level can be highlighted using a marker 570 and/or by rendering the selected flight level using visually distinguishable characteristics. This particular embodiment renders the selected flight level 560 in a bright green color, to make it easily distinguishable from the cyan-colored flight level 556 of the host aircraft 502 and from the remaining flight levels.

In response to the selection of the flight level 560, the ITP display 500 is changed to visually highlight or otherwise distinguish the intervening neighboring aircraft 512, 514. For this particular example, the intervening neighboring aircraft 512, 514 are rendered using solid white outlines, while the non-intervening neighboring aircraft are grayed out, made transparent, or the like. As depicted in FIG. 6, the intervening neighboring aircraft 512, 514 reside between the current flight level 556 of the host aircraft 502 and the selected flight level 560, and the other neighboring aircraft 510, 516 are now rendered in a less prominent manner. These changes to the ITP display 500 enable the user to quickly and easily focus on potentially blocking aircraft, which may need to be considered before maneuvering to the selected flight level 560. In response to the selection of the flight level 560, the lateral display 400 is also refreshed to visually highlight or otherwise distinguish the intervening neighboring aircraft 412, 414, preferably following the scheme utilized for the ITP display 500. Thus, as shown in FIG. 6, the intervening neighboring aircraft 412, 414 remain in view on the lateral display 400, but the non-intervening neighboring aircraft 410, 416 (on the same track 430) are now rendered in a less prominent manner. These changes to the lateral display 400 make it easier for the user to focus on potentially blocking aircraft that are traveling in the same track as the host aircraft.

Referring again to FIG. 3, the process 300 may also update the lateral display and the ITP display to visually highlight, indicate, or distinguish any reference aircraft located between the current flight level of the host aircraft and the selected flight level (task 316). In practice, therefore, a reference aircraft will by definition be one of the intervening aircraft. As used here, a "reference aircraft" is a neighboring aircraft of interest (i.e., a potentially blocking aircraft) that satisfies predetermined criteria. For example, the ITP specifies some minimum separation between aircraft at the current and requested flight levels to ensure safe altitude changes. Moreover, the ITP specifies certain criteria that must be satisfied before the host aircraft can issue a request for ITP flight level change (such requests are issued to Air Traffic Control (ATC)). Although different criteria could be utilized by an embodiment of the subject matter described here, exemplary embodiments may follow the accepted ITP initiation criteria, where at least one of two conditions must be met: (1) if the ITP distance to a reference aircraft is greater than or equal to 15 nautical miles, then the groundspeed differential between the two aircraft must be less than or equal to 20 knots; or (2) if the ITP distance to a reference aircraft is greater than or equal to 20 nautical miles, then the groundspeed differential between the two aircraft must be less than or equal to 30 knots. The ITP initiation criteria can be analyzed by the onboard system to determine whether or not a given intervening aircraft qualifies as a reference aircraft for purposes of issuing an ITP request.

Figure 7:
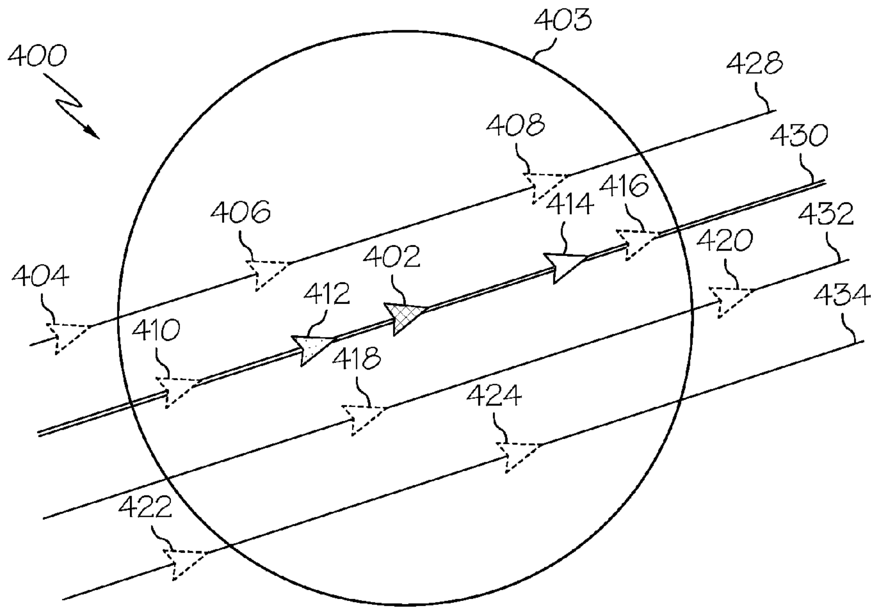
Figure 7:
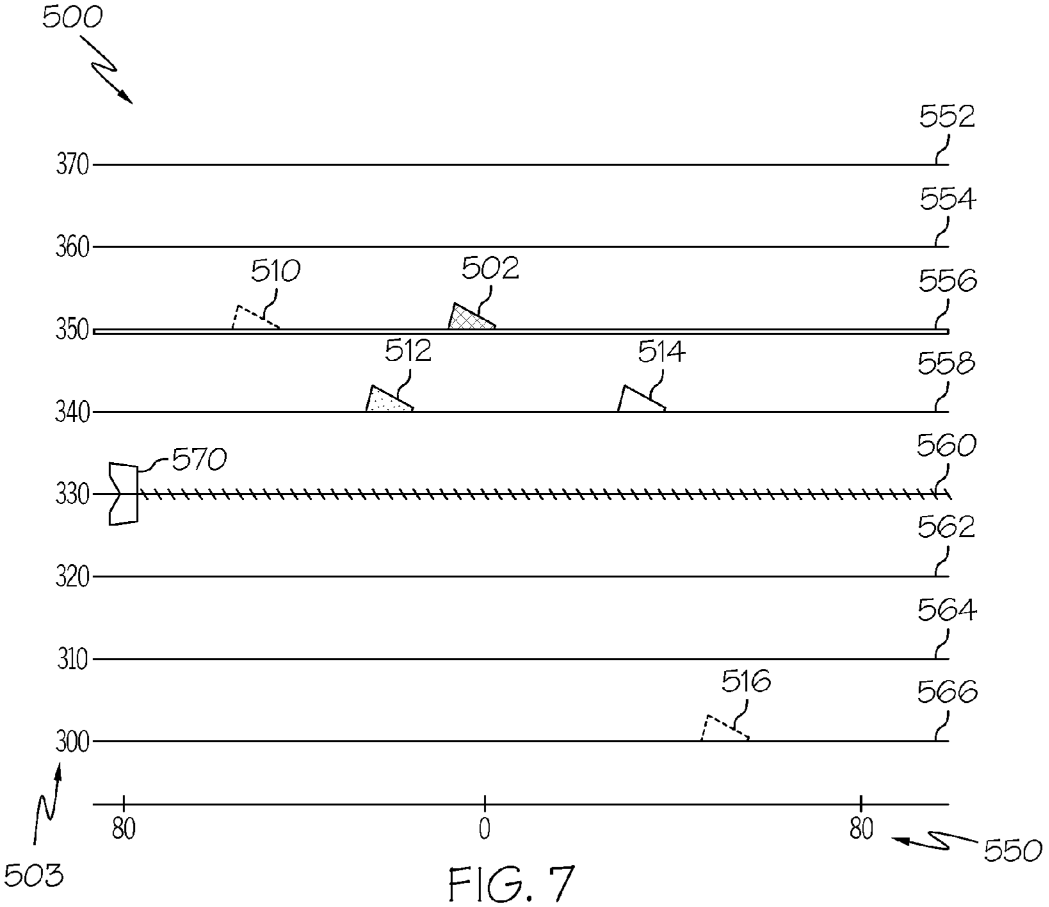

This example assumes that the system has identified one reference aircraft. Accordingly, FIG. 7 depicts the lateral display 400 and the ITP display 500 after the reference aircraft has been identified and visually highlighted. For this example, the neighboring aircraft 412, 512 is the reference aircraft. Although any scheme can be employed to distinguish the reference neighboring aircraft 412, 512, this example renders the reference neighboring aircraft 412, 512 using a bold outline color that is different than the remaining aircraft. In particular, the reference neighboring aircraft 412, 512 may be rendered using a thick and bright green colored outline to make it stand out from the host aircraft 402, 502, the intervening neighboring aircraft 414, 514, and all of the remaining neighboring aircraft (which remain grayed out). These changes to the lateral display 400 and the ITP display 500 enable the user to quickly and easily determine which (if any) of the intervening aircraft are eligible for the ITP procedure and which (if any) represent blocking aircraft.

The lateral display 400 and/or the ITP display 500 (preferably, both) can be generated and rendered to accommodate the selection of a displayed reference aircraft. In practice, a user could select a reference aircraft by manipulating a pointing device, by manipulating a keyboard or a keypad, by interacting with a touch-screen area, or the like. Referring again to FIG. 3, if no reference aircraft is selected (the "No" branch of query task 318), then the process 300 may exit and return to an appropriate task. For example, the process 300 may wait for the next refresh or update time, it may continue monitoring for the selection of a reference aircraft, it may check for the selection of a different flight level, or it may check for the selection of a different track.

If the process 300 receives a command or instruction that indicates selection of a reference aircraft rendered on either the lateral display or the ITP display (the "Yes" branch of query task 318), then the system responds in an appropriate manner to generate and render an active GUI control element on the display element (task 320). The display may also be refreshed to change the appearance of the selected reference aircraft. The GUI control element may be rendered in conjunction with a message, such as a pop-up message, that includes content associated with a flight level change request. In this way, the GUI control element enables a user to request a flight level change (e.g., an ITP request) from the current flight level of the host aircraft to the selected flight level.

Figure 8:
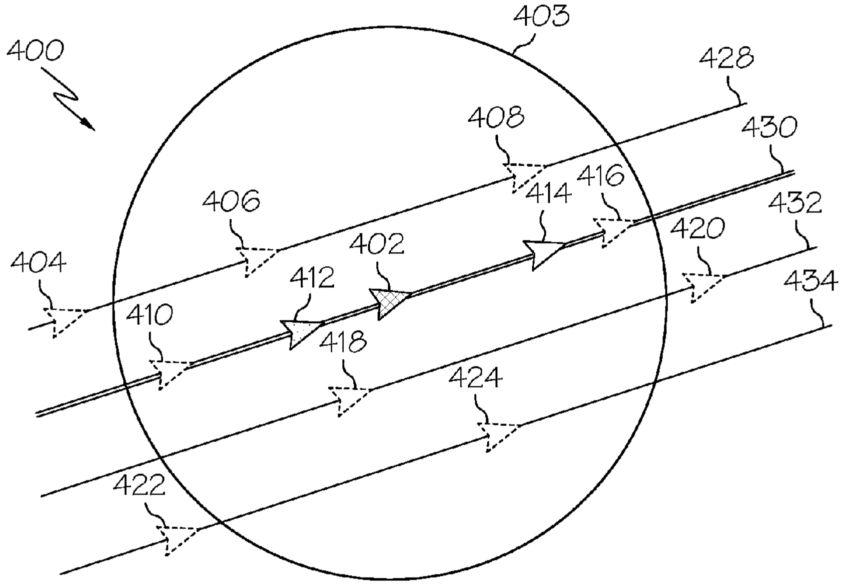
Figure 8:
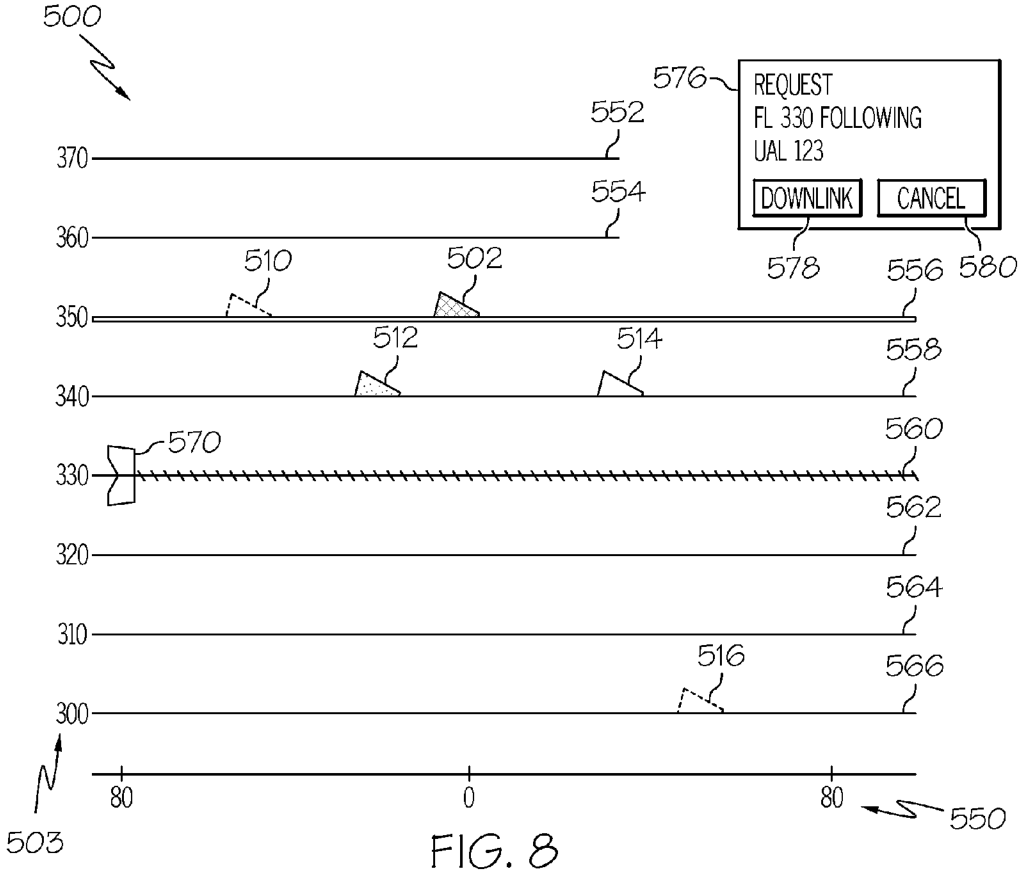

FIG. 8 depicts the lateral display 400 and the ITP display 500 following the selection of the reference neighboring aircraft 412, 512. In certain embodiments, the reference neighboring aircraft 412, 512 is further highlighted or otherwise altered to reflect its selection. Alternatively, the lateral display 400 could remain unchanged in response to the selection of the reference neighboring aircraft 412, 512. Likewise, most of the ITP display 500 remains unchanged in response to the selection of the reference neighboring aircraft 412, 512. As shown in FIG. 8, a pop-up message 576 is rendered in a suitable location of the ITP display 500. Alternatively (or additionally), the pop-up message 576 may be rendered in the lateral display 400, on a different display element, in a reserved area of the display, or the like.

This particular embodiment of the pop-up message 576 includes text that indicates the desired flight level change, namely, "Request FL330 Following UAL123" (where UAL123 identifies the reference aircraft and FL330 identifies the selected flight level). In practice, the content of the request may be formatted in accordance with any agreed upon standard, such as the requirements set forth in the ITP. Of course, an embodiment of the system described here may utilize different message types and may generate additional content in the pop-up message 576 if so desired. The pop-up message 576 may include any number of active GUI control elements, such as a "Downlink" button 578 and a "Cancel" button 580. The Downlink button 578 is activated to send the request from the host aircraft using an appropriate communication system such as the Datalink system. In this regard, the Downlink button 578 may also be considered to be a "Send" button, an "Enter" button, a "Request" button, or the like. The Cancel button 580 is activated to cancel the request without sending it. The system responds in an appropriate manner when a user selects either the Downlink button 578 or the Cancel button 580, and the display is refreshed such that the pop-up message 576 is removed.

FIGS. 5-8 correspond to a situation where the user selects the track on which the host aircraft 402 is currently travelling, namely, the track 430. The display system 100 and the processes 200, 300 may also be configured to respond to the selection of a track other than the host aircraft track. In such situations, the display system enters a preview mode that allows the user to gain a visual understanding of the flight traffic conditions and flight level change criteria relative to different tracks.

Figure 9:
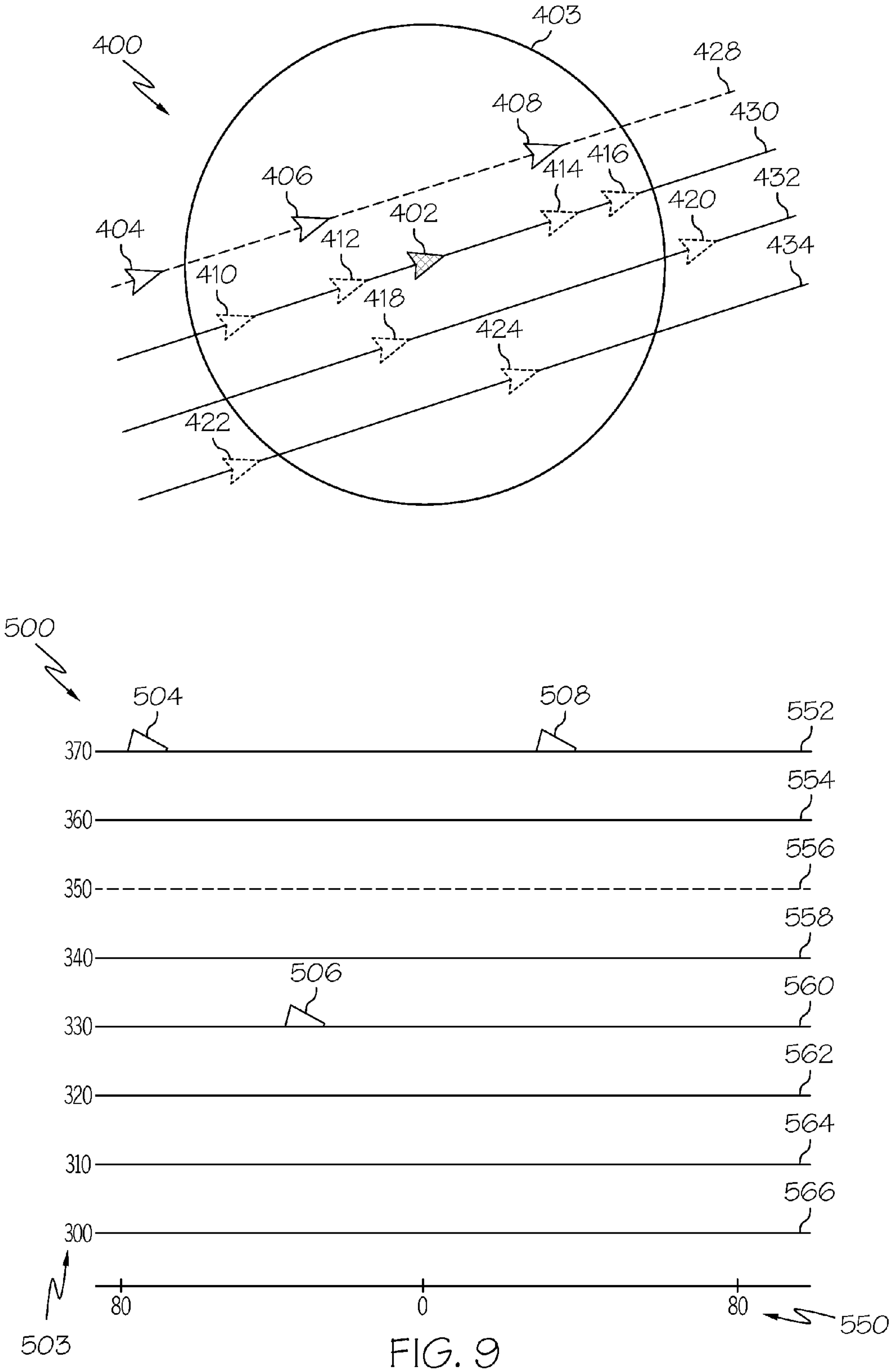

FIG. 9 depicts the lateral display 400 and the ITP display 500 following the selection of a displayed track other than the host aircraft track. This example assumes that the track 428 is the selected track. Accordingly, the lateral display 400 has been refreshed such that the track 428 is highlighted or is otherwise rendered in a visually distinguishable manner relative to the remaining tracks 430, 432, 434. For example, the track 428 may be rendered in a distinct color (such as cyan) and/or it may be rendered in a different pattern or weight relative to the lines that correspond to the other tracks 430, 432, 434. If the host aircraft track 430 is rendered in a color (such as cyan), then the selected track 428 should be rendered in a manner that is visually distinguishable from the host aircraft track 430. For example, the selected track 428 can be rendered as a cyan colored dashed line to distinguish it from the host aircraft track 430 and to distinguish it from the remaining tracks 432, 434. As explained above with reference to FIG. 5, the neighboring aircraft on the selected track 428 (namely, the neighboring aircraft 404, 406, 408) are highlighted or otherwise rendered in a visually distinguishable manner relative to the other neighboring aircraft.

In response to the selection of the track 428, the ITP display 500 is updated to hide or remove all aircraft other than the neighboring aircraft traveling on the selected track 428 (i.e., the neighboring aircraft 504, 506, 508). Notably, the host aircraft no longer appears in the ITP display 500 because the host aircraft is not aligned with the selected track 428 (i.e., the host aircraft has a flight path that does not correspond to the selected track 428). In other words, the ITP display 500 is transformed such that it represents a side profile view of only the selected track 428, and such that it is void of graphical representations of other aircraft, including the host aircraft. The ITP display 500 may also be updated to highlight or otherwise visually distinguish the current flight level of the host aircraft (namely, the flight level 556) relative to the other displayed flight levels. For example, the flight level 556 may be rendered in a distinct color (such as cyan) and/or it may be rendered in a different pattern weight relative to the lines that correspond to the other displayed flight levels. The appearance of the host aircraft flight level 556 during the preview mode may be different than its appearance during the standard or normal mode. This example renders the flight level 556 as a solid cyan colored line for the normal mode (see FIG. 5) and as a dashed cyan colored line for the preview mode (see FIG. 9). These changes to the ITP display 500 allow the user to visualize the vertical situation of neighboring traffic from the perspective of an adjacent track.

Figure 10:
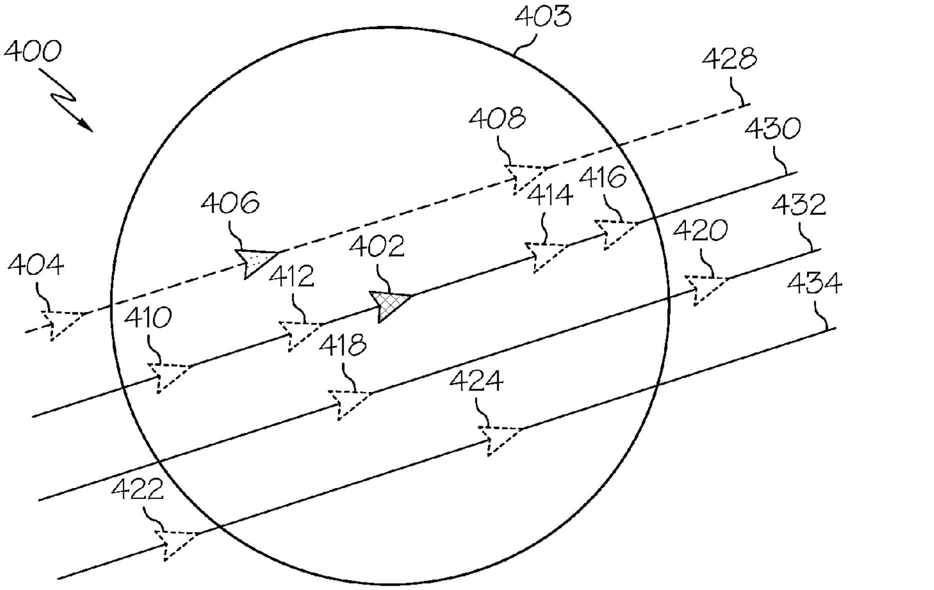
Figure 10:
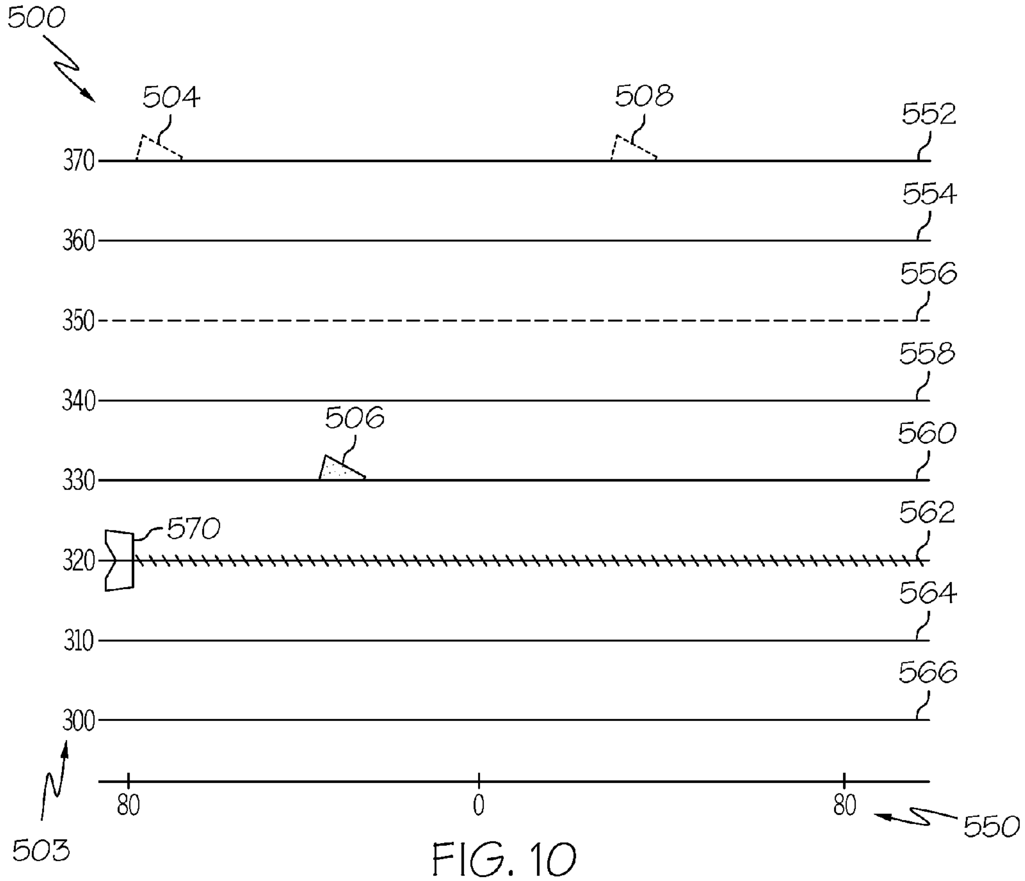

The preview mode also allows the user to select a displayed flight level and to preview potential reference aircraft associated with the selected flight level. FIG. 10 depicts the lateral display 400 and the ITP display 500 following the selection of a displayed flight level. This example assumes that the flight level 562 has been selected. As described above, the selected flight level can be highlighted using the marker 570 and/or by rendering the selected flight level using a distinct color or pattern. In response to the selection of the flight level 562, the ITP display 500 is refreshed to visually highlight or otherwise distinguish intervening neighboring aircraft or potential reference aircraft located between the current flight level of the host aircraft and the selected flight level. For this example, the neighboring aircraft 506 is the only intervening aircraft. Accordingly, the intervening neighboring aircraft 506 is rendered using visually distinguishable characteristics. These changes to the ITP display 500 enable the user to quickly and easily determine ITP traffic on an adjacent track.

In response to the selection of the flight level 562, the lateral display 400 is also refreshed to visually highlight or otherwise distinguish the intervening neighboring aircraft 406, preferably following the scheme utilized for the ITP display 500. Thus, as shown in FIG. 10, the intervening neighboring aircraft 406 remains in view on the lateral display 400, but the non-intervening neighboring aircraft 404, 408 (on the same track 428) are now rendered in a less prominent manner. These changes to the lateral display 400 make it easier for the user to focus on potentially blocking aircraft that are traveling on the selected track 428.

The methodologies described above allow a flight deck display system of a host aircraft to visually represent ITP traffic with additional graphical cues and interactive capabilities linking a lateral display with an ITP display. The methodologies described above also allow a user of the display system to send an ITP request in an easy and intuitive manner that reduces workload and increases situational awareness.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of displaying aircraft traffic information on a display element of a host aircraft, the method comprising:

displaying a lateral display comprising graphical representations of the host aircraft and a plurality of parallel tracks corresponding to flight path constraints for the host aircraft and for neighboring aircraft other than the host aircraft;

receiving a command that indicates selection of one of the plurality of parallel tracks; and in response to receiving the command, displaying a vertical situation display (VSD) comprising graphical representations of neighboring aircraft, each of the neighboring aircraft having a respective flight path that corresponds to the selected track, the VSD being void of graphical representations of neighboring aircraft having flight paths that do not correspond to the selected track, wherein the host aircraft has a flight path that does not correspond to the selected track.

2. The method of claim 1, further comprising: in response to receiving the command, updating the lateral display to visually distinguish the selected track.

3. The method of claim 1, wherein the VSD displays the graphical representations of neighboring aircraft in accordance with an altitude filter setting such that the VSD is void of graphical representations of neighboring aircraft that do not satisfy the altitude filter setting.

4. The method of claim 1, wherein the lateral display and the VSD are displayed in a split-screen arrangement on the display element.

5. The method of claim 1, further comprising:

receiving an instruction that indicates selection of a flight level rendered on the VSD; and in response to receiving the instruction, updating the VSD to visually distinguish a first subset of the neighboring aircraft, the first subset representing intervening neighboring aircraft located between the selected flight level and a current flight level of the host aircraft.

6. The method of claim 5, further comprising: in response to receiving the instruction, updating the lateral display to visually distinguish the first subset of the neighboring aircraft.

7. The method of claim 1, further comprising:

receiving an instruction that indicates selection of a flight level rendered on the VSD; and in response to receiving the instruction, updating the VSD to visually distinguish a first subset of the neighboring aircraft, the first subset representing reference neighboring aircraft located between the selected flight level and a current flight level of the host aircraft, the reference neighboring aircraft satisfying flight level change criteria.

8. The method of claim 7, further comprising: in response to receiving the instruction, updating the lateral display to visually distinguish the first subset of the neighboring aircraft.

9. The method of claim 7, further comprising: in response to a selection of a reference neighboring aircraft, generating an active graphical user interface (GUI) element on the display element, the active GUI element enabling a user to request a flight level change from the current flight level of the host aircraft to the selected flight level.

10. The method of claim 1, further comprising: obtaining current flight status data of the host aircraft and current flight status data of the neighboring aircraft, wherein the lateral display and the VSD are displayed in response to the current flight status data of the host aircraft and the current flight status data of the neighboring aircraft.

11. A method of displaying aircraft traffic information on a display element of a host aircraft, the method comprising:

displaying a lateral display comprising graphical representations of the host aircraft and a plurality of tracks corresponding to flight path constraints for the host aircraft and for neighboring aircraft other than the host aircraft;

receiving a command that indicates selection of one of the plurality of tracks; and in response to receiving the command, displaying a vertical situation display (VSD) comprising graphical representations of neighboring aircraft, each of the neighboring aircraft having a respective flight path that corresponds to the selected track, the VSD being void of graphical representations of neighboring aircraft having flight paths that do not correspond to the selected track;

wherein:

the host aircraft has a flight path that does not correspond to the selected track;

the VSD is void of a graphical representation of the host aircraft; and the VSD is displayed to visually distinguish a current flight level of the host aircraft.

12. A flight deck display system for a host aircraft that is constrained to a set of parallel oceanic flight paths corresponding to a plurality of parallel designated tracks, the system comprising:

an aircraft-to-aircraft data communication module that receives current flight status data of neighboring aircraft, the neighboring aircraft being constrained to the set of parallel oceanic flight paths;

a processor coupled to the aircraft-to-aircraft data communication module, the processor being configured to obtain and process the current flight status data along with current host aircraft flight status data, and the processor being configured to generate image rendering display commands based upon the current flight status data and the current host aircraft flight status data; and a display element coupled to the processor and configured to receive the image rendering display commands and, in response thereto, to render an in-trail procedure (ITP) display that includes graphical representations of a number of neighboring aircraft, each of the neighboring aircraft having a respective parallel oceanic flight path that corresponds to a selected track of the plurality of parallel designated tracks, the ITP display being void of graphical representations of any neighboring aircraft having flight paths that do not correspond to the selected track, wherein the host aircraft has a flight path that does not correspond to the selected track.

13. The flight deck display system of claim 12, wherein:

the processor updates the image rendering display commands in response to an instruction that indicates selection of a flight level rendered on the ITP display; and in response to the updated image rendering display commands the display element renders the ITP display to visually distinguish a first subset of the neighboring aircraft, the first subset representing intervening neighboring aircraft located between the selected flight level and a current flight level of the host aircraft.

14. The flight deck display system of claim 12, wherein:

the processor updates the image rendering display commands in response to an instruction that indicates selection of a flight level rendered on the ITP display; and in response to the updated image rendering display commands, the display element renders the ITP display to visually distinguish a first subset of the neighboring aircraft, the first subset representing ITP reference aircraft located between the selected flight level and a current flight level of the host aircraft, the ITP reference aircraft satisfying ITP flight level change requirements.

15. The flight deck display system of claim 14, wherein:

the processor refreshes the image rendering display commands in response to a selection of an ITP reference aircraft; and in response to the refreshed image rendering display commands, the display element renders the ITP display with an ITP request control element, the ITP request control element enabling a user to request an ITP flight level change from the current flight level of the host aircraft to the selected flight level.

16. A method of displaying aircraft traffic information on a display element of a host aircraft, the method comprising:

displaying a lateral display comprising graphical representations of a plurality of parallel tracks corresponding to flight path constraints, the host aircraft, and neighboring aircraft, wherein the host aircraft and the neighboring aircraft are displayed in alignment with the plurality of parallel tracks;

displaying an in-trail procedure (ITP) display comprising graphical representations of a plurality of flight levels including a current flight level of the host aircraft;

receiving a command that indicates selection of one of the plurality of parallel tracks displayed on the lateral display, resulting in a selected track; and in response to receiving the command, displaying, on the ITP display, graphical representations of selected neighboring aircraft traveling on the selected track, in the absence of graphical representations of any neighboring aircraft traveling on tracks other than the selected track, wherein the host aircraft has a flight path that does not correspond to the selected track.

17. The method of claim 16, further comprising:

receiving an instruction that indicates selection of one of the flight levels displayed on the ITP display, resulting in a selected flight level;

in response to receiving the instruction, updating the ITP display to visually highlight intervening neighboring aircraft located between the selected flight level and the current flight level of the host aircraft, and to visually highlight ITP reference aircraft that satisfy ITP flight level change requirements; and in response to receiving the instruction, updating the lateral display to visually highlight the intervening neighboring aircraft and to visually highlight the ITP reference aircraft.

18. The method of claim 17, further comprising: in response to selection of an ITP reference aircraft on the ITP display, displaying an ITP request control element, the ITP request control element enabling a user to request an ITP flight level change from the current flight level of the host aircraft to the selected flight level.

19. The method of claim 17, further comprising: in response to selection of an ITP reference aircraft on the lateral display, displaying an ITP request control element, the ITP request control element enabling a user to request an ITP flight level change from the current flight level of the host aircraft to the selected flight level.

* * * * *